United States Patent
Etter

(10) Patent No.: US 10,914,648 B2
(45) Date of Patent: Feb. 9, 2021

(54) PRESSURE SENSOR FOR DETECTING A PRESSURE OF A FLUID MEDIUM IN A MEASURING CHAMBER

(71) Applicant: Robert Bosch GmbH, Stuttgart (DE)

(72) Inventor: Daniel Etter, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 224 days.

(21) Appl. No.: 15/689,891

(22) Filed: Aug. 29, 2017

(65) Prior Publication Data

US 2018/0080844 A1    Mar. 22, 2018

(30) Foreign Application Priority Data

Sep. 22, 2016   (DE) .................. 10 2016 218 211

(51) Int. Cl.
| | | |
|---|---|---|
| *G01L 7/08* | (2006.01) | |
| *G01L 9/00* | (2006.01) | |
| *G01L 9/08* | (2006.01) | |
| *G01L 9/04* | (2006.01) | |
| *G01L 19/14* | (2006.01) | |

(52) U.S. Cl.
CPC .............. *G01L 9/04* (2013.01); *G01L 9/0027* (2013.01); *G01L 9/0051* (2013.01); *G01L 19/148* (2013.01)

(58) Field of Classification Search
CPC ..... G01L 9/00; G01L 9/0027; G01L 9/04–08; G01L 7/08
See application file for complete search history.

(56) References Cited

U.S. PATENT DOCUMENTS

| 7,151,431 B2* | 12/2006 | Ooba ..................... G01L 1/2287 338/2 |
| 7,513,164 B1* | 4/2009 | Khemet ................ G01L 9/0055 73/706 |
| 9,714,876 B2* | 7/2017 | Huo ....................... G01L 9/0054 |
| 9,939,340 B2* | 4/2018 | Novellani ........... G01L 19/0092 |
| 10,048,147 B2* | 8/2018 | Saitoh ................... G01L 9/0052 |

(Continued)

FOREIGN PATENT DOCUMENTS

| CN | 102175363 A | 9/2011 |
| CN | 202126319 U | 1/2012 |

(Continued)

OTHER PUBLICATIONS

Konrad Reif, "Sensoren im Kraftfahzeug, [Sensors in the motor vehicle]", 1st edition, 2010, pp. 80-82 and 134-136.

*Primary Examiner* — Nguyen Q. Ha

(74) *Attorney, Agent, or Firm* — Norton Rose Fulbright US LLP; Gerard Messina

(57) ABSTRACT

A pressure sensor for detecting a pressure of a fluid medium in a measuring chamber and a method for manufacturing the pressure sensor are provided. The pressure sensor includes a pressure connector, with the aid of which the pressure sensor is attachable to or in the measuring chamber, and a sensor element for detecting the pressure of the fluid medium. A feed channel is formed in the pressure connector. The sensor element is situated on a substrate. The feed channel is sealed off by the substrate and is designed to feed the fluid medium to the sensor element. The pressure connector and the substrate are designed as one piece and the sensor element is printed onto the substrate.

10 Claims, 1 Drawing Sheet

(56) References Cited

U.S. PATENT DOCUMENTS

| | | | | |
|---|---|---|---|---|
| 2007/0074577 A1* | 4/2007 | Cobianu | ............... | G01L 1/2262 |
| | | | | 73/715 |
| 2007/0186661 A1* | 8/2007 | Ricks | ................. | G01L 19/0084 |
| | | | | 73/715 |
| 2013/0192379 A1* | 8/2013 | Petrarca | ................ | G01L 19/147 |
| | | | | 73/754 |
| 2016/0202136 A1* | 7/2016 | Miyashita | ............. | G01L 9/0058 |
| | | | | 73/726 |
| 2017/0082512 A1* | 3/2017 | Saitoh | ................... | G01L 9/0052 |
| 2017/0082513 A1* | 3/2017 | Saitoh | ................... | G01L 9/0051 |
| 2018/0038753 A1* | 2/2018 | May | ...................... | G01L 27/002 |

FOREIGN PATENT DOCUMENTS

| | | | | | |
|---|---|---|---|---|---|
| CN | 202661202 U | 1/2013 | | | |
| CN | 105092138 A | 11/2015 | | | |
| DE | 102009054689 A1 | 6/2011 | | | |
| DE | 102011088044 A1 | 6/2013 | | | |
| EP | 2175252 B1 * | 9/2013 | ........... | G01L 9/0042 |
| JP | 09243472 A * | 9/1997 | ............... | G01L 9/04 |

\* cited by examiner

PRESSURE SENSOR FOR DETECTING A PRESSURE OF A FLUID MEDIUM IN A MEASURING CHAMBER

CROSS REFERENCE

The present application claims the benefit under 35 U.S.C. § 119 of German Patent No. DE 102016218211.0 filed on Sep. 22, 2016, which is expressly incorporated herein by reference in its entirety.

BACKGROUND INFORMATION

Various conventional devices and methods for detecting pressures of fluid media such as, for example, gases and liquids, are available. The measurand pressure is a non-directed force effect active on all sides occurring in gases and liquids. There are dynamically and statically operating measuring elements or sensors for measuring the pressures. Dynamically operating pressure sensors are used only for measuring pressure oscillations in gaseous or liquid media. The pressure may be measured directly, for example, via diaphragm deformation or by a force sensor. In principle, it would be possible, in particular, for measuring very high pressures, to expose an electrical resistor to the medium, because many conventional electrical resistors exhibit a pressure dependency. In such case, however, the suppression of the simultaneous dependency of the resistors on the temperature and the pressure-tight lead-through of the electrical connections out of the pressure medium proves difficult.

Thus, to obtain signals, one widely used method of pressure detection initially uses a thin diaphragm as a mechanical intermediate step, which is exposed to the pressure on one side and which deflects under its influence. It may be adapted within wide limits according to the thickness and the diameter of the respective pressure range. Low pressure measuring ranges result in comparatively large diaphragms with deflections that may be in the range of 0.1 mm to 1 mm. High pressures, however, require thicker diaphragms having a small diameter that generally deflect by only a few micrometers. Such pressure sensors are described, for example in Konrad Reif (ed.): Sensoren im Kraftfahrzeug, [Sensors in the motor vehicle] 1st edition, 2010, pages 80-82 and pages 134-136.

In order to attach the pressure sensors in or to the measuring chamber, such sensors normally include a pressure connector. The pressure connector may be designed as a threaded connector, for example, and screwed into a wall of a measuring chamber. The actual measuring element or the actual sensor element is situated on a base, either directly or indirectly via an intermediate support. The base is formed either integrally or as a single piece with the pressure connector as described, for example in German Patent Application NO. DE 10 2009 054 689 A1, or the base and the pressure connector are separate components, which are permanently connected to one another with the aid of a weld as described, for example in German Patent Application No. DE 10 2011 088 044 A1.

Conventional pressure sensors, despite their numerous advantages, still have improvement potential. Thus, the sensor element in the aforementioned related art is manufactured with the aid of thin film technology or as a silicon strain gauge glazed onto a substrate or carrier. The substrate or the carrier in this case includes a diaphragm. Due to the semiconductor technology used, the thin film, which is used for creating the resistors of the sensor element, may only be applied on small pill-shaped substrates or carriers. These pills are then welded onto a pressure connector having a feed channel. Due to the weld seam, it is not possible to use this sensor for high-pressure applications of, for example, 3000 bar, since the weld seam will rupture.

SUMMARY

A pressure sensor and a method for manufacturing the same is provided, which may at least largely avoid the disadvantages of known pressure sensors and which, in particular, enables sensors having high signal accuracy to also be used for maximum pressure applications. The present invention is fundamentally suited for detecting a pressure at any point of use, in particular, in the area of the pressures to be measured in a motor vehicle, in particular, of the high pressures and maximum pressures prevalent, for example, in a common rail.

The provided pressure sensor is used to detect a pressure of a fluid medium in a measuring chamber. The pressure may, in principle, be detected as an absolute pressure and/or also as a differential pressure. In addition, when integrating respective components accordingly, it is possible to determine one or multiple additional physical and/or chemical properties of the fluid medium, including for example a temperature, an additional pressure, a flow property or one or multiple other properties.

The measuring chamber may, in principle, be an arbitrary space, in which the fluid medium, i.e., a gas and/or a liquid, is/are accommodated, at rest or flowing. The measuring chamber may, in particular, be a part of a fuel system. The pressure sensor may thus be used or designed, in particular, for detecting a fuel pressure.

The pressure sensor includes a pressure connector, with the aid of which the pressure sensor is attachable to or in the measuring chamber. A feed channel is formed in the pressure connector. The pressure connector may be designed, for example, as a pressure port. A pressure port is understood within the scope of the present invention to mean an attachment or tube section having at least one bore, through which the fluid medium may be guided to the sensor element, for example, a cylindrical bore in a cylindrical connecting piece. The pressure port may be designed as a pressure-resistant connecting piece, in order, for example, to avoid being damaged by the high pressures which occur in a fuel line.

The pressure connector may be fixable in the wall of the measuring chamber, in particular, with the aid of one or of multiple connecting elements, for example, with the aid of at least one male thread, which engages in a female thread of the wall of the measuring chamber. However, other fixations are also alternatively or additionally possible. The fixation may be, in particular, pressure-tight and/or media-tight.

The pressure sensor furthermore includes a sensor element for detecting the pressure of the fluid medium. The sensor element is situated on a substrate. The substrate includes a diaphragm. A diaphragm is understood within the scope of the present invention to mean a thin layer of a material. Diaphragms have the property of deforming under a load, in particular, to bend, to absorb tensile forces only and to be able to transfer these forces to their edges. Such a diaphragm has a thickness of 100 µm to 300 µm, for example, 200 µm.

The feed channel is sealed off by the substrate and is designed to feed fluid medium to the sensor element. According to the present invention, it is provided that the pressure connector and the substrate are formed with the diaphragm as one piece and the sensor element is printed onto the substrate. Thus, in the present invention, a one-piece pressure port having an integrated diaphragm is used. The advantage of this concept is that the diaphragm is seated on the pressure port without a weakening weld seam and thus, the maximum pressure areas may be covered. The printing of the sensor element onto the diaphragm permits a very precise designing of the sensor element itself with small design shapes. The sensor element may be applied, for example, with the aid of screen printing. Screen printing has the advantage that it is a cost-efficient method, which may also be used for small-scale series. After screen printing, a thermal process for the cross-linking or for a remelting is usually required. The present invention allows for the use of different designs of the sensor element.

The pressure connector and the substrate preferably have a monolithic design, i.e., are made up of one piece, cohesive and jointless. Thus, for example, the pressure connector and the substrate are manufactured as a single component made of metal.

The sensor element may be designed, in particular, as a structured layer. A layer is understood within the scope of the present invention to be a uniform mass having an extended surface of a certain height, which lies above, below or between other elements. Accordingly, the sensor element may be designed to be thin and the individual sensitive elements are formed as structures in the layer.

The layer may be manufactured from metal. Such a material may be easily structured. For example, the metal is an alloy such as, for example, CuNiMn.

A layer having electrically insulating properties, in particular, a dielectric, may be situated between the sensor element and the diaphragm. In this way, the sensor element is electrically insulated from the pressure connector, which is normally manufactured from metal, in order to thus avoid signal distortions.

One method according to the present invention for manufacturing a pressure sensor for detecting a pressure of a fluid medium includes:
  providing a pressure connector, with the aid of which the pressure sensor is attachable to or in the measuring chamber, a feed channel being formed in the pressure connector,
  sealing off the feed channel with a substrate,
  situating a sensor element for detecting the pressure of the fluid medium on the substrate, the feed channel being designed to feed the fluid medium to the sensor element; the pressure connector and the substrate being designed as one piece; the sensor element being printed onto the substrate.

The sensor element may be printed and structured as a layer on the substrate. The layer is printed onto the substrate, for example, with the aid of screen printing.

The layer may be manufactured from metal, since such materials may be easily structured.

A layer having electrically insulating properties, in particular, a dielectric, may be situated between the sensor element and the diaphragm, as a result of which the sensor element is electrically insulated from the pressure connector.

In accordance with the present invention, a printing method is applied in order to electrically insulate a one-piece pressure connector and to provide it with a functional layer, for example, a Wheatstone bridge, in order to measure the warping, strain and stretching of a metal diaphragm.

The warping of the metal diaphragm occurs due to existing pressure from a pressure channel or feed channel. With the aid of printing technologies, it is possible to apply various, in particular, nanoscale, dispersions and pastes additively with the aid of masks or digitally on two-dimensional and three-dimensional surfaces. After printing, the structures may be thermally activated with the aid of lasers, ultraviolet radiation or infrared radiation, via kiln processes or by electrical sintering, in order to manufacture electrically conductive structures, for example.

For this purpose, a printable, sensory material is adapted to standard motor vehicle technology requirements and an insulation for the stainless steel diaphragms is evaluated. With the aid of screen printing, it is feasible to print strain sensors on insulated stainless steel substrates.

An insulation layer (polymeric oxide) is printed or sprayed on as a first layer, in order to electrically insulate the functional layer from the metal carrier. In the second step, the functional layer (CuNiMn) is applied in a structured manner with the aid of screen printing.

With the present invention, it is possible to implement a one-piece pressure sensor made up of a sensor element and a threaded piece, which allows for new design possibilities of a pressure sensor and is more cost-efficiently manufacturable. No clean room technology is required in order to implement the sensor element layers. Moreover, the method according to the present invention allows for an easier manufacturing of sensor structures.

BRIEF DESCRIPTION OF THE DRAWINGS

Additional optional details and features of the present invention result from the following description of preferred exemplary embodiments, which are schematically depicted in the figures.

DETAILED DESCRIPTION OF EXAMPLE EMBODIMENTS

Figure 1:
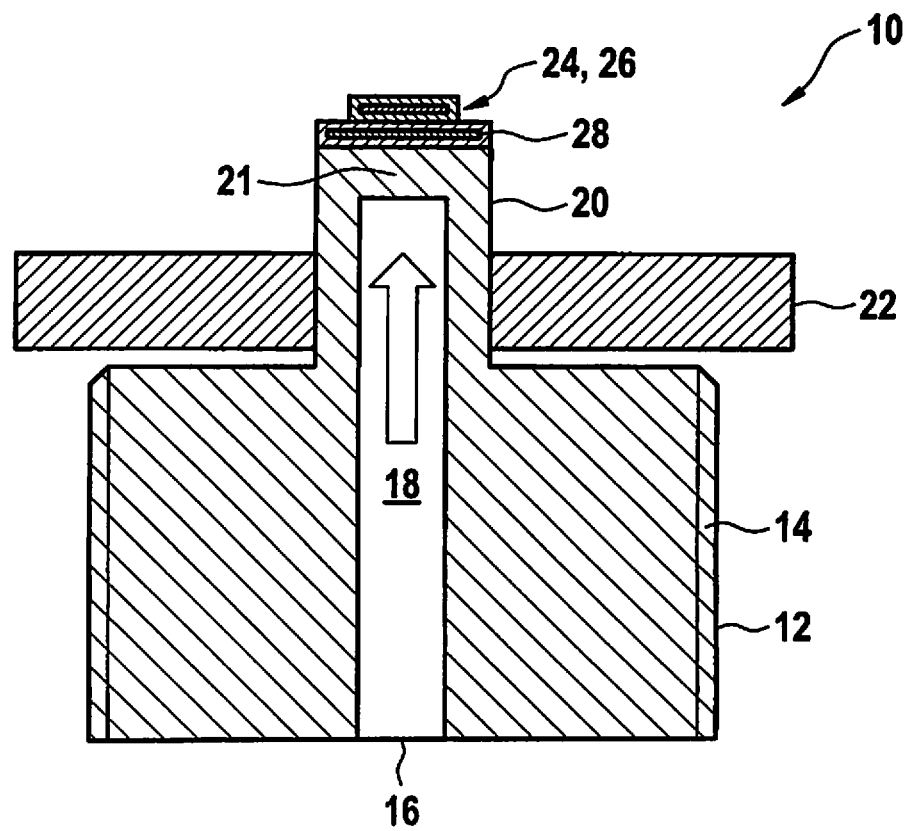
FIG. 1 shows a cross sectional view of a pressure sensor according to the present invention.

FIG. 1 shows an exemplary specific embodiment of a pressure sensor 10 according to the present invention. Pressure sensor 10 may be designed, for example, for detecting a pressure of fuel in a fuel line of an internal combustion engine. Pressure sensor 10 includes a pressure connector 12. Pressure connector 12 is designed as a pressure port and includes a male thread 14. Male thread 14 is used to fasten pressure connector 12 to or in a wall of the measuring chamber, male thread 14 engaging in a suitably shaped female thread of the wall of the measuring chamber. Pressure connector 12 is manufactured from metal.

Pressure connector 12 includes an opening 16 at one end for the pressurized medium to be measured, which is located in a measuring chamber not shown, such as for example, a fuel line. A feed channel 18 is formed in pressure connector 12. Feed channel 18 is connected to opening 14. Feed channel 18 is sealed off by a substrate 20 having a diaphragm 21. Substrate 20 is situated in such a way that diaphragm 21 is located at an end of pressure connector 12 opposite opening 16. Pressure connector 12 is furthermore connected to a housing base 22 in the shape of a hexagon. A sensor housing, not further shown, may be situated on housing base 22.

Pressure connector 12 and substrate 20 are designed as one piece and preferably monolithically. Thus, pressure connector 12 and substrate 20 are manufactured as one component from metal. A sensor element 24 for detecting the pressure of the fluid medium is situated on substrate 20. More precisely, sensor element 24 is printed onto substrate 20. Feed channel 18 in this case is designed to feed the fluid medium to sensor element 24. Sensor element 24 is designed as a structured layer 26. Layer 26 is manufactured from metal. A layer 28 having electrically insulating properties may optionally be situated between layer 26 and diaphragm 20. For example, a dielectric is situated between layer 26 and substrate 20. Layer 28 having electrically insulating properties is manufactured, for example, from polymeric oxide.

Figure 2:
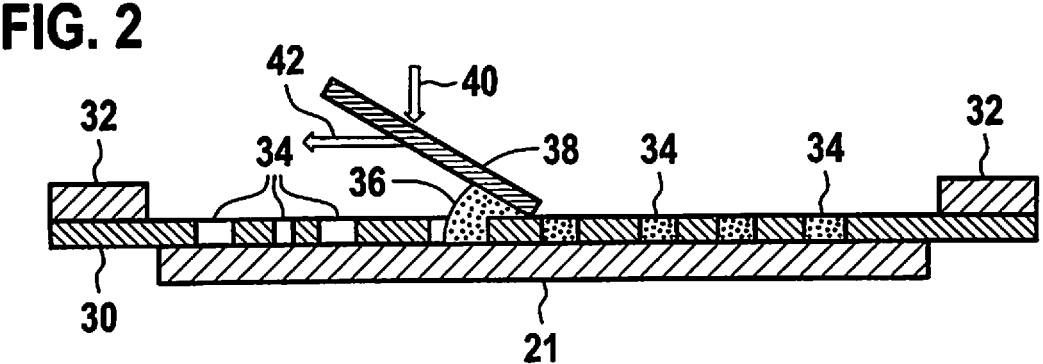
FIGS. 2 and 3 show cross sectional views of various steps of a method according to the present invention for manufacturing the pressure sensor.
Figure 3:
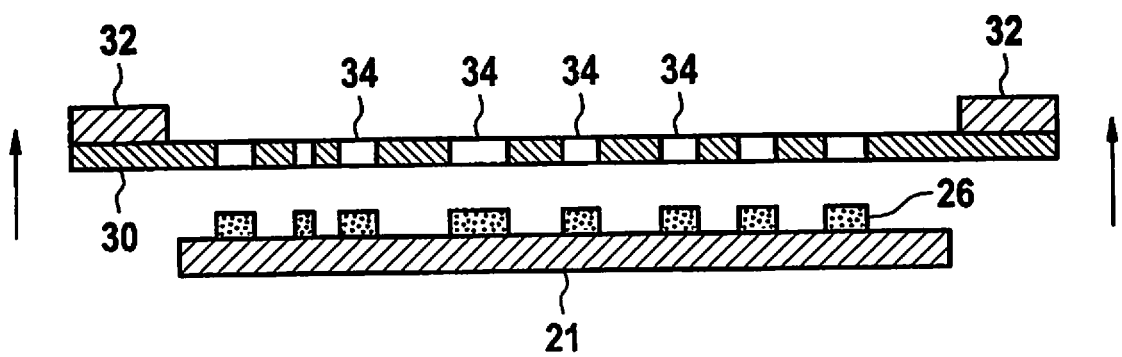

One method for manufacturing pressure sensor 10 is described below with reference to FIGS. 2 and 3. FIGS. 2 and 3 in this case show cross sectional views of various steps of the method for manufacturing pressure sensor 10.

FIG. 2 shows a cross sectional view at the start of the method. Pressure connector 12 is provided. Feed channel 18 is formed inside pressure connector 12. Feed channel 18 may be designed, for example, as a bore, which extends from one end of pressure connector 12 into the pressure connector without fully penetrating the pressure connector. Thus, pressure connector 12 is designed with opening 16 and connected feed channel 18. Because feed channel 18 is formed in the manner of a blind hole, feed channel 18 is sealed off by substrate 20. As a result, substrate 20 and pressure connector 12 are designed as one piece, in particular, monolithically. FIG. 2 in this case shows merely a detail of pressure sensor 10 in the area of diaphragm 21 of the substrate.

Optional layer 28 made of an electrically insulating material is printed onto diaphragm 21 of substrate 20, for example, with the aid of screen printing. Optional layer 28 may have a layer thickness of 10 μm to 100 μm, for example, 25 μm and is a function of the respective method of application. A screen 30 having a screen frame 32 on the outer edge is placed on diaphragm 21. Screen 30 includes openings 34 for the structures to be formed. A printing paste 36 is applied to screen 30. Printing paste 36 is manufactured, for example, from CuNiMn. The printing paste is filled or spread into openings 34 with the aid of a doctor knife 38, which is pressed onto the screen in the direction of arrow 40 and moved in the direction of arrow 42.

FIG. 3 shows a cross sectional view of a subsequent method step. Screen 30 is removed or detached from diaphragm 21. Printing paste 36 previously filled into openings 34 remains on diaphragm 21 and forms the structuring of sensor element 24. Following the screen printing, a thermal process for the cross-linking or a remelting may be necessary. In this way, sensor element 24 is implemented as structured layer 26.

Sensor element 24 is located therefore in the interior of the sensor housing and is thus protected from external influences and, in particular, from the fluid medium. Sensor element 24 is situated, in particular, in or on sensor housing 24 in such a way that it is indirectly exposable to the medium for measuring the pressure of the medium. Sensor element 24 includes, for example, resistors on the side of diaphragm 21 facing away from the medium. These resistors may be connected to form a Wheatstone bridge, the resistance of which changes due to the pressure applied from the underside of diaphragm 21 and of the resulting deformation of diaphragm 21. The preparation and signal amplification of the pressure signal takes place with the aid of an evaluation circuit, not further shown, on a circuit board, which may be implemented in the form of an application-specific integrated circuit, (ASIC), also referred to as custom-chip, or by a hybrid. An ASIC is an electronic circuit, which has been implemented as integrated circuitry. The function of an ASIC is therefore no longer manipulable.

What is claimed is:

1. A pressure sensor for detecting a pressure of a fluid medium in a measuring chamber, comprising:
    a pressure connector with the aid of which the pressure sensor is attachable to or in the measuring chamber; and
    a sensor element to detect the pressure of the fluid medium, a feed channel being formed in the pressure connector, the sensor element being situated on a substrate, wherein the substrate includes a diaphragm, the feed channel being sealed off by the substrate and being designed to feed the fluid medium to the sensor element;
    wherein the pressure connector and the substrate are designed as one piece and the sensor element is printed onto the diaphragm via screen printing,
    wherein the pressure connector and the substrate are manufactured as a single component made of metal.

2. The pressure sensor as recited in claim 1, wherein the pressure connector and the substrate are monolithically designed.

3. The pressure sensor as recited in claim 1, wherein the sensor element is designed as a structured layer.

4. The pressure sensor as recited in claim 3, wherein the structured layer is manufactured from metal.

5. The pressure sensor as recited in claim 1, wherein a layer having electrically insulating properties, is situated between the sensor element and the substrate, the layer having the electrically insulating properties being a dielectric.

6. A method for manufacturing a pressure sensor for detecting a pressure of a fluid medium in a measuring chamber, comprising:
    providing a pressure connector with the aid of which the pressure sensor is attachable to or in the measuring chamber, a feed channel being formed in the pressure connector;
    sealing off the feed channel with a substrate, wherein the substrate includes a diaphragm;
    situating a sensor element for detecting the pressure of the fluid medium on the substrate, the feed channel being designed to feed the fluid medium to the sensor element;
    wherein the pressure connector and the substrate are designed as one piece and the sensor element is printed onto the diaphragm via screen printing,
    wherein the pressure connector and the substrate are manufactured as a single component made of metal.

7. The method as recited in claim 6, wherein the sensor element is printed as a layer onto the substrate and structured.

8. The method as recited in claim 7, wherein the structured layer is manufactured from metal.

9. The method as recited in claim 6, wherein the sensor element is printed on the substrate with the aid of screen printing.

10. The method as recited in claim 6, wherein a layer having electrically insulating properties is situated between the sensor element and the substrate, wherein the layer having electrically insulating properties is a dielectric.

* * * * *